US012612141B2

(12) United States Patent
Collins et al.

(10) Patent No.: US 12,612,141 B2
(45) Date of Patent: Apr. 28, 2026

(54) MATERIAL-ACTUATED LAUNCH AND RECOVERY DOORS

(71) Applicant: Raytheon BBN Technologies Corp., Cambridge, MA (US)

(72) Inventors: Robert Andrew Collins, Cambridge, MA (US); Joseph William Post, Watertown, MA (US); Timothy M. Quinn, Gloucester, MA (US); James Joseph Stusse, Middletown, RI (US); William B. Coney, Watertown, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 678 days.

(21) Appl. No.: 18/082,164

(22) Filed: Dec. 15, 2022

(65) Prior Publication Data

US 2024/0060350 A1 Feb. 22, 2024

Related U.S. Application Data

(60) Provisional application No. 63/398,334, filed on Aug. 16, 2022.

(51) Int. Cl.
B63G 8/00 (2006.01)
B63B 19/08 (2006.01)
F03G 7/06 (2006.01)

(52) U.S. Cl.
CPC .............. B63G 8/001 (2013.01); B63B 19/08 (2013.01); F03G 7/0614 (2021.08); B63G 2008/002 (2013.01); E05Y 2400/44 (2013.01); E05Y 2400/45 (2013.01); E05Y 2400/61 (2013.01);

(Continued)

(58) Field of Classification Search
CPC ....... B63G 8/001; B63B 19/08; F03G 7/0614; F03G 7/06143; F03G 7/06145; F03G 7/0615; F03G 7/065; E05Y 2400/45
See application file for complete search history.

(56) References Cited

U.S. PATENT DOCUMENTS

| 8,821,224 | B2 | 9/2014 | Alexander et al. |
| 9,168,989 | B2 | 10/2015 | Ahn et al. |
| 10,079,335 | B2 | 9/2018 | Ahn et al. |

(Continued)

OTHER PUBLICATIONS

Disawal et al. "Life cycle analysis of electrically actuated SMA spring using Talbot interferometry" Applied Optics 57.20 (Jul. 2018) pp. 5779-5783.

(Continued)

*Primary Examiner* — Andrew Polay
(74) *Attorney, Agent, or Firm* — CANTOR COLBURN LLP

(57) ABSTRACT

A material-actuated door includes a door housing including a flexible material; and one or more least one Shape Memory Alloy (SMA) actuators embedded in the door housing. Each SMA actuator is elastically biased in a first actuator physical state and is configured to transition into a second actuator physical state in response to receiving electrical current. The material-actuated door is transitioned into a first door position in response to disconnecting the electrical current to the at least one SMA actuator, and is transitioned into a second door position in response to delivering the electrical current to the at least one SMA actuator.

18 Claims, 9 Drawing Sheets

(52) U.S. Cl.
       CPC ... *E05Y 2800/344* (2013.01); *E05Y 2800/674*
                    (2013.01); *E05Y 2900/514* (2013.01)

(56)                  References Cited

U.S. PATENT DOCUMENTS

| | | | |
|---|---|---|---|
| 2012/0174571 A1 | 7/2012 | Villanueva et al. | |
| 2019/0030988 A1* | 1/2019 | MacLean | B60H 1/249 |
| 2022/0252056 A1* | 8/2022 | Müller | F03G 7/063 |
| 2022/0299016 A1* | 9/2022 | Tsuruta | F03G 7/0645 |

OTHER PUBLICATIONS

Dunić "Shape memory alloys in automotive industry—Overview, application, modeling" (Oct. 2020) International Congress Motor Vehicles & Motors 2020, MVM2020-036 pp. 1-4.

Fang et al. "Modeling and design optimization of shape memory alloy-enabled building skins for adaptive ventilation" Journal of Intelligent Material Systems and Structures 33.16 (Sep. 2022) pp. 2086-2105.

Jani et al. "A review of shape memory alloy research, applications and opportunities" Materials & Design (1980-2015) 56 (Apr. 2014) pp. 1078-1113.

Martins et al. "Polymer-based actuators: back to the future" Physical Chemistry Chemical Physics 22.27 (2020) pp. 15163-15182.

Smith et al. "Development of shape memory alloy (SMA) actuated mechanisms for spacecraft release applications" (1999) SSC99-XI-7, 13th AIAA/USU Conference on Small Satellites pp. 1-11.

Smith et al. "Working principle of bio-inspired shape memory alloy composite actuators" Smart Materials and Structures 20.1 (Dec. 2010) pp. 1-7.

Sutton "USN XLUUV" Covert Shores (Oct. 2019) 20:2019. <URL: http://www.hisutton.com/USN_XLUUV.html> 14 pages.

Wikipedia contributors. "Air Flower" LIFT architects <URL: http://www.liftarchitects.com/air-flower> Web. Oct. 14, 2025. (10 pages).

Wikipedia contributors. "Technology readiness level." Wikipedia, The Free Encyclopedia. Wikipedia, The Free Encyclopedia, Jul. 20, 2025. Web. Oct. 14, 2025.

Wu et al. "Industrial applications for shape memory alloys" Proceedings of the international conference on shape memory and superelastic technologies. vol. 171. (Apr. 2000) pp. 1-9.

* cited by examiner

MATERIAL-ACTUATED LAUNCH AND RECOVERY DOORS

CROSS-REFERENCE TO RELATED APPLICATIONS

This application claims priority to U.S. Provisional Application Ser. No. 63/398,334, filed Aug. 16, 2022, the contents of which are hereby incorporated by reference in its entirety.

BACKGROUND

The present disclosure relates to generally to vehicles, and more particularly, to vehicles including launch and recovery doors.

Vehicles carrying internal payloads may use mechanical doors to protect the payload and/or reduce drag during transit. The conventional doors implemented on payload vehicles are typically designed as a uniformly rigid material door panel, which are opened and closed using an arrangement of mechanical components such as for example, metal linkages, bearings, motors, and actuators. These various mechanical components, however, consume space, add weight to the vehicle, and/or are a source of noise when operating the door.

SUMMARY

According to a non-limiting embodiment, a material-actuated door includes a door housing with a flexible material and a shape memory alloy (SMA) actuator embedded in the door housing. The SMA actuator is elastically biased in a first physical state and is configured to transition into a second physical state in response to receiving electrical current. In this manner, the material-actuated door is relaxed into a closed-position in response to disconnecting the electrical current to the at least one SMA actuator, and is activated into an open-position in response to delivering the electrical current to the at least one SMA actuator.

According to another non-limiting embodiment, a material-actuated door control system comprises a material-actuated door, at least one Shape Memory Alloy (SMA) actuator embedded in the material-actuated door, and a power supply. The at least one SMA actuator is elastically biased in a relaxed state when not receiving electrical current, and is configured to transition into an activated state in response to receiving electrical current. The power supply is in signal communication with the at least one SMA actuator, and is configured to output the electrical current. The material-actuated door is induced into a relaxed, closed-position in response to disconnecting the power supply so as to disconnect the electrical current from the SMA actuator and is activated into the open-position in response to activating the power supply so as to deliver the electrical current to the at least one SMA actuator.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As previously noted, conventional rigid doors used to protect an internal vehicle payload typically operate according to a variety of mechanical components, which can take up space in the payload bay and act as a source of noise when actuated. Various non-limiting embodiments provides material-actuated doors, which can be installed on a vehicle to protect an internal payload. The material-actuated doors include Shape Memory Alloy (SMA) actuators included in compliant door panels including a flexible encapsulating material. The SMA actuators are biased in a first physical state (e.g. a relaxed state) when not receiving electrical current and are configured to transition into a second physical state (e.g., an activated state) in response to temperature changes effected by flowing electrical current through the SMA actuator. Accordingly, the doors 102 can be biased in a closed position when disconnecting electrical current to the SMA actuators and thereby causing the temperature to exist below a temperature threshold. On the other hand, the SMA actuators can be induced into the second physical state (e.g., an activated state) in response to receiving electrical current such that a temperature of the SMA actuator exceeds the temperature threshold. Accordingly, the material-actuated doors are forced into an open-position which provides access to the internal payload space. The electrical current can then be disconnected and the temperature can then fall below the temperature threshold such that the biasing force relaxes the material-actuated doors into the closed position, e.g., to completely close the doors.

Figure 1:
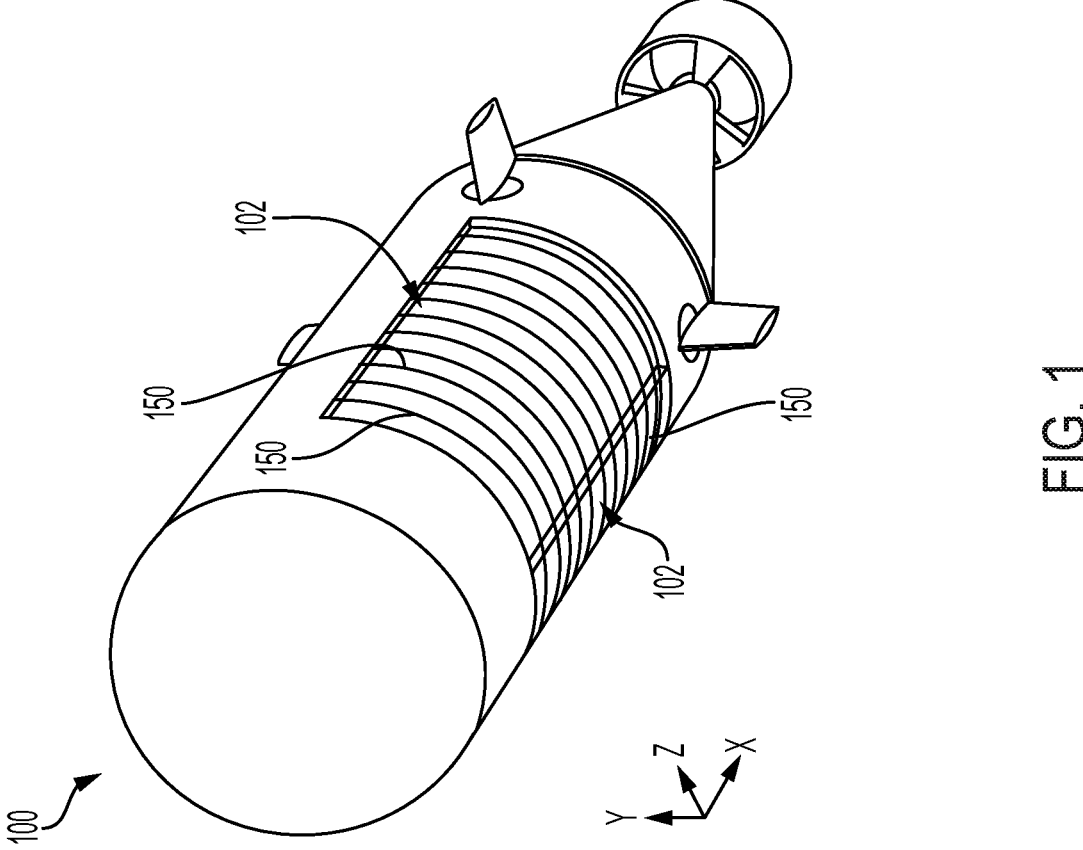
FIG. 1 depicts a vehicle including material-actuated doors in a closed position according to a non-limiting embodiment.

With reference now to FIG. 1, a vehicle 100 including material-actuated doors 102 is illustrated according to a non-limiting embodiment. The vehicle 100 is described herein as an Unmanned underwater vehicles (UUV) including two material-actuated doors 102. It should be appreciated, however, that the present teachings described herein can be applied to various other types of vehicles (e.g., manned and/or unmanned) having more or less doors without departing from the scope of the invention.

The doors 102 extending along a first direction (e.g., an X-axis) to define a length, a second direction (e.g., a Y-axis) that is orthogonal to the first axis to define a width, and a third direction (e.g., a Z-axis) that is orthogonal to the first and second axes to define a thickness. Opposing surfaces extending along the first and second axes define upper and lower surfaces of the doors 102. Surfaces extending along the third axis between the upper and lower surfaces define door edges. Accordingly, the upper surface, the lower surface, and the door edges define an outer shell or housing of a respective door 102. The upper surface, the lower surface, and the door edges can be formed of a flexible polymer or other type of flexible material, which allows the doors 102 to relax into a closed position and to activate into an open position as described herein.

Figure 2:
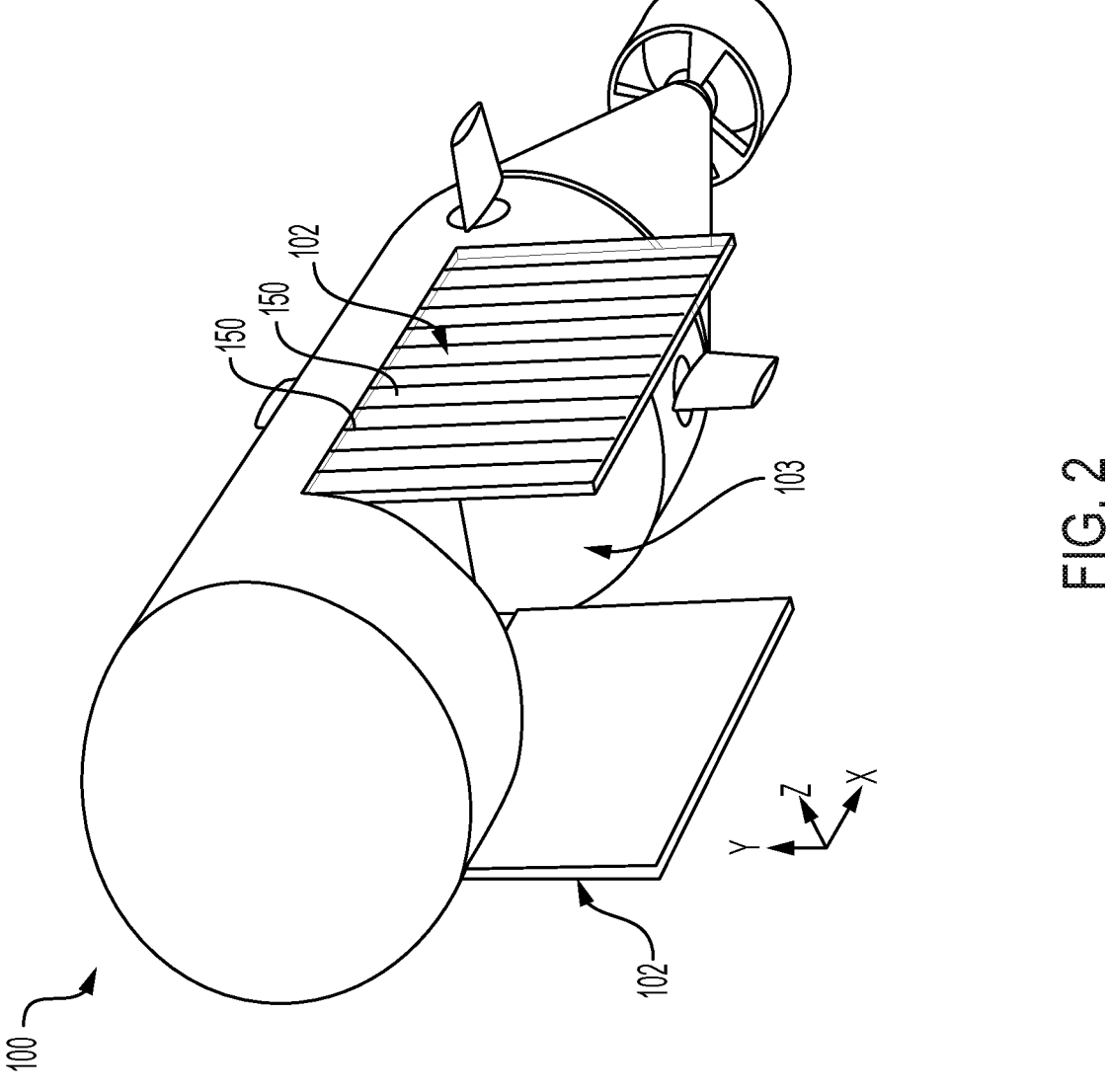
FIG. 2 depicts a vehicle including material-actuated doors in a fully opened position according to a non-limiting embodiment.

The doors 102 include one or more Shape Memory Alloy (SMA) actuators 150. The SMA actuators 150 are embedded in the doors 102 (e.g., encapsulated by the door housing), which are elastically biased in a closed position (e.g., relaxed) when the SMA actuators 150 are deactivated as shown in FIG. 1. In response to activating the SMA actuators 150, the doors 102 are induced into an open position (e.g., expanded) which bends the doors outward and exposes the payload bay 103 as shown in FIG. 2. Although the present disclosure describes the doors 102 as being forced into a relaxed, closed-state when the SMA actuators 150 are cool (i.e., below a temperature threshold) while current is disconnected therefrom and forced into an activated, open-state when the SMA actuators 150 are heated (i.e., above a temperature threshold) while current is delivered thereto, it should be appreciated that in some non-limiting embodiments the doors 102 can be forced into an activated closed-state when the SMA actuators 150 are heated while current is delivered thereto and can be relaxed into an open-state when the SMA actuators 150 are cool while current is disconnected therefrom. In this manner, the doors may be relaxed into an open-position when the power supply 122 fails or is unable to generate power.

Figure 3:
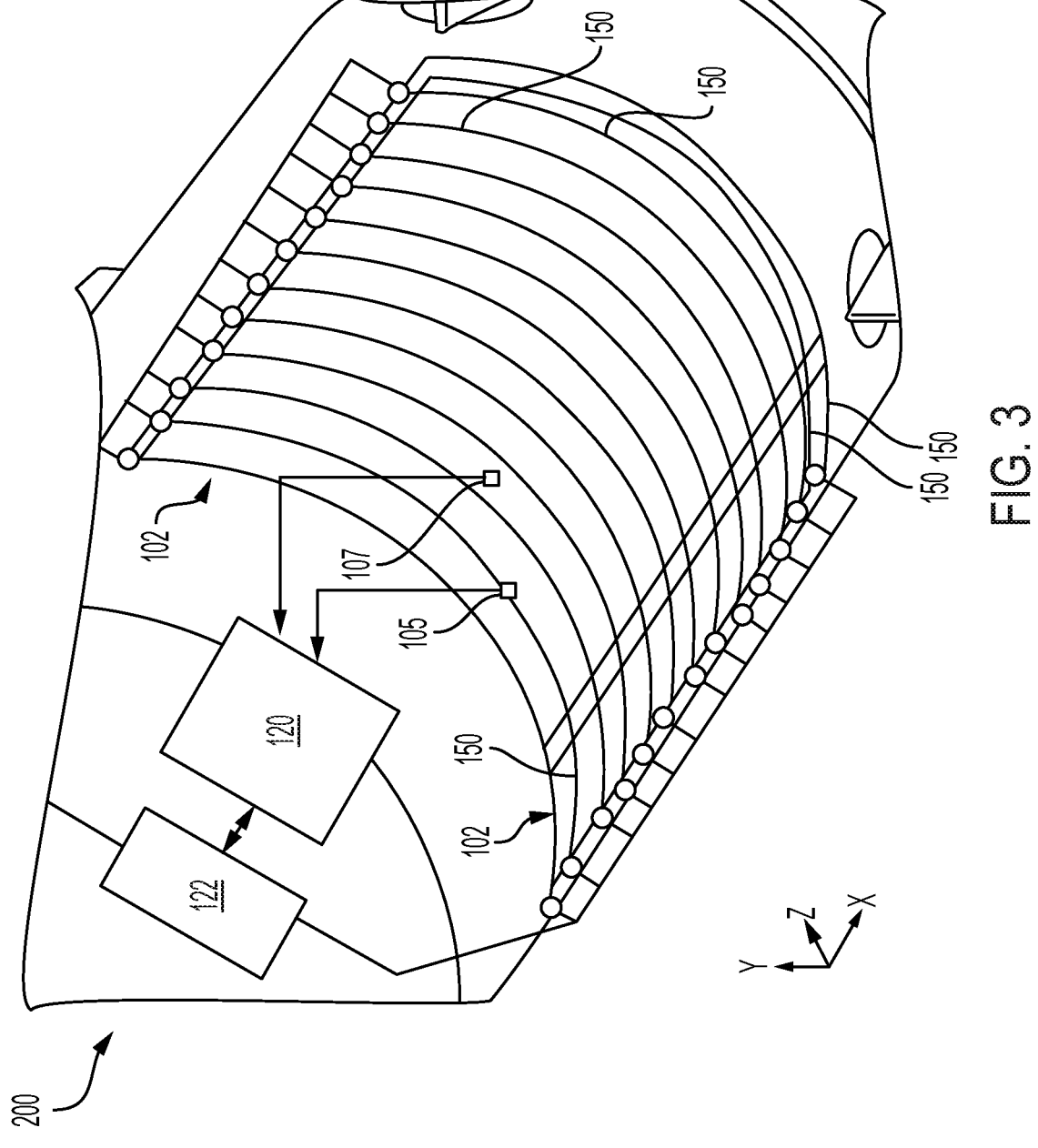
FIG. 3 depicts a material-actuated door control system operating the doors in the closed position according to a non-limiting embodiment.
Figure 4:
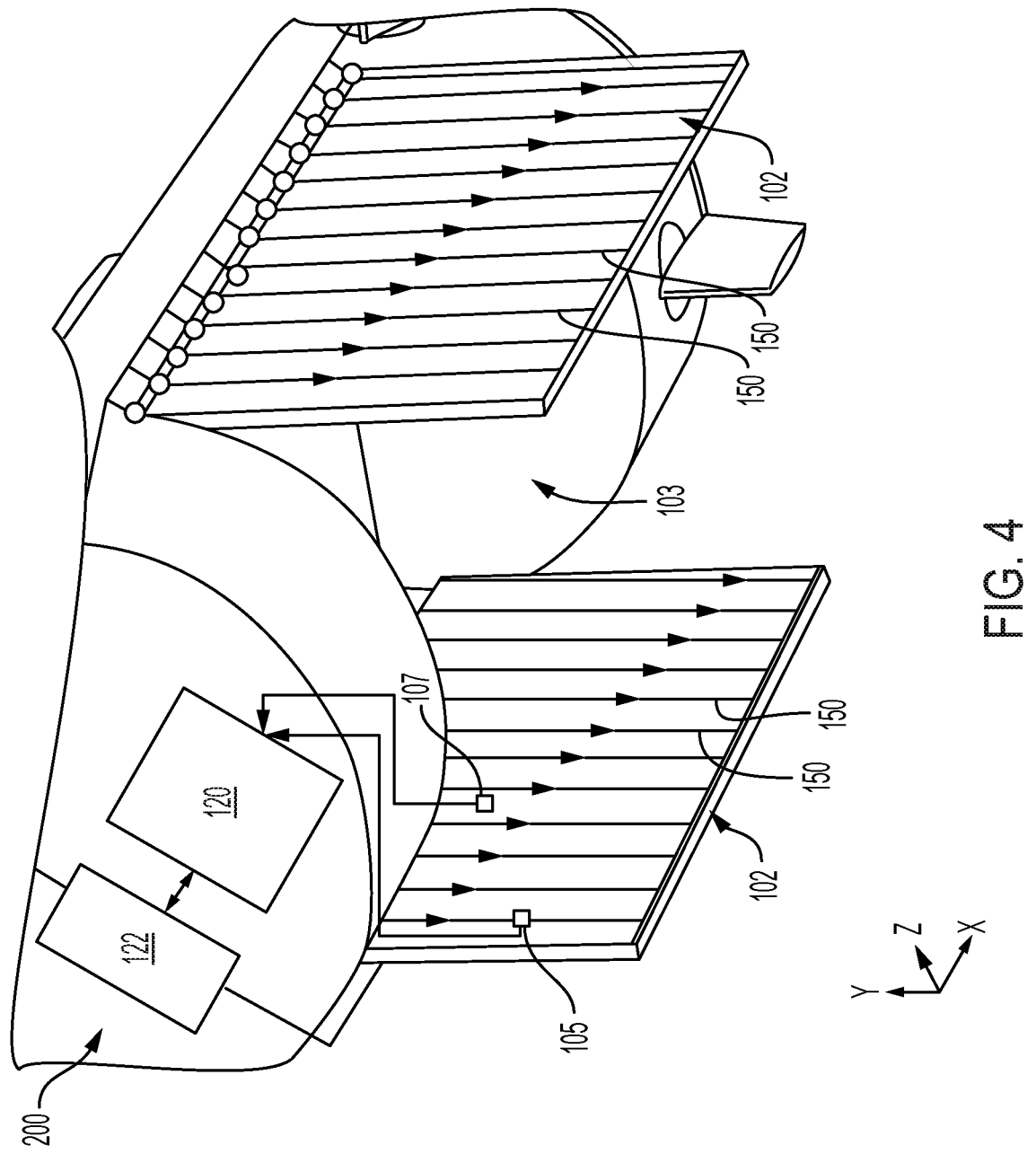
FIG. 4 depicts a material-actuated door control system operating the doors in the open position according to a non-limiting embodiment.

Turning now to FIGS. 3 and 4, a material-actuated door control system 200 is illustrated according to a non-limiting embodiment. The material-actuated door control system 200 is configured to control the doors 102, and includes a controller 120, a power supply 122, and one or more sensors 105 and 107. As described herein, the material-actuated door control system 200 can facilitate a closed-loop control operation to open and close the doors 102 while substantially reducing, or even completely eliminating, the traditional mechanical components (e.g., metal linkages, bearings, motors, and actuators) found in conventional door assemblies.

The power supply 122 is configured to deliver electrical current to each of the SMA actuators 150 included in the doors 102. The controller 120 is in signal communication with the power supply 122 and the sensors 105 and 107. The sensors 105 and 107 include, but are not limited to, a temperature sensor and a strain sensor. The temperature sensor 105 can be coupled to one or more of the SMA actuators 150. Accordingly, the temperature sensor 105 can output a measurement signal indicating the measured temperature of a respective SMA actuator 150. For example, current flowing through a given SMA actuator 150 increases the temperature of the actuator 150, which in turn is measured by the temperature sensor 105. The strain sensor 107 can be coupled to the doors 102 at various locations. As the doors 102 are expanded outward, the strain sensor 107 is strained, causing its electrical resistance to change and causing the strain sensor 105 to output a measurement sensor indicating the resistance change indicative of a measured strain. This resistance change, which can be measured according to a Wheatstone bridge, for example, is related to the amount of strain realized by the doors 102.

Although the sensors 105 and 107 are described herein to allow for detecting whether the doors 102 are open or closed, it should be appreciated that the sensors 105 and 107 can be omitted without departing from the scope of the invention. For example, electrical current is delivered to the SMA actuator(s) 150 to increase the temperature and open the doors 102, and current is disconnected from the SMA actuator(s) 150 to close doors 102 as described herein.

The controller 102 is configured to receive an input to open or close the doors 102, and determine a state of the doors 102 based on the measured temperature output from the temperature sensors 105 and/or the measured strain measured by the strain sensors 107. Based on the input, the controller 102 can determine the current state of the doors 102 and control the power supply 122 to operate the doors 102 based on the input and the current door state.

In one or more non-limiting embodiments, the controller 120 can be programmed with a temperature threshold and/or a strain threshold that can be used as reference values indicating whether the doors 102 are closed or open. For example, the controller 120 receives the measured temperature output from the temperature sensor 105 and/or the measured strain output from the strain sensor 107 and compares the measured temperature and/or the measured strain to the temperature threshold and strain threshold, respectively. When the measured temperature is less than or equal to the temperature threshold and/or the measured strain is less than or equal to the strain threshold, the controller 120 determines that the doors 102 are closed. When, however, the measured temperature is exceeds the temperature threshold and/or the measured strain exceeds the strain threshold, the controller 120 determines that the doors 102 are open.

In response to receiving an input requesting to open the doors, the controller 120 initially determines the current state of the doors 102 as described herein. When the doors are closed, the controller 120 outputs a control signal to the power supply 122, which is configured to initiate (e.g. switch on) the power supply 122.

In response to receiving the control signal, the power supply 122 outputs electrical current (indicated by arrows) which is delivered to the SMA actuators 150 embedded in the doors 102 as shown in FIG. 4. The electrical current heats the SMA actuators 150, which causes them to expand. The expansion of the SMA actuators 150 forces the doors 102 to bend outward and into the open position to expose the payload bay 103. Accordingly, the power supply 122 can remain delivering electrical current so as to maintain the doors 102 in the open position.

Figure 5:
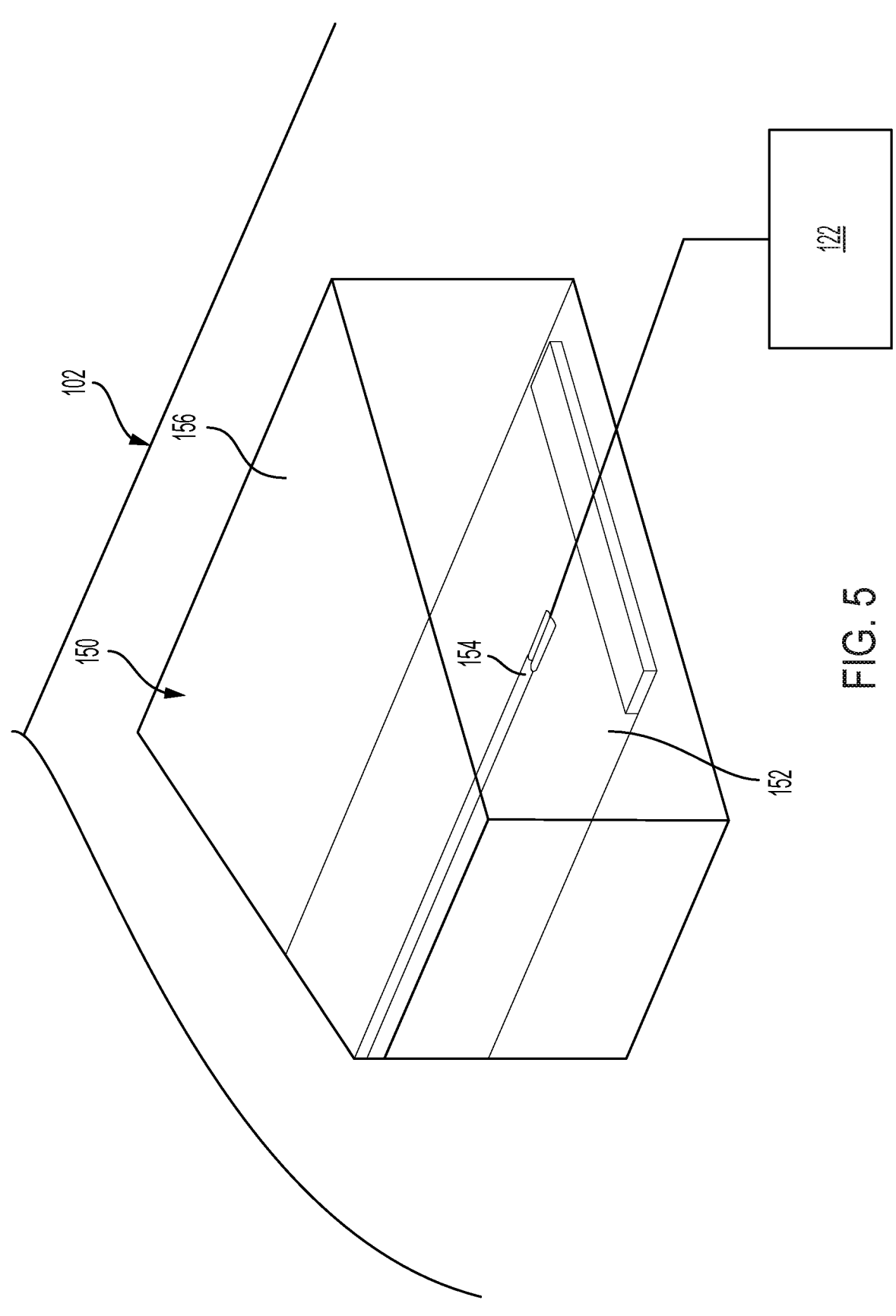
FIG. 5 depicts a Shape Memory Alloy (SMA) actuator included in a material-actuated door according to a non-limiting embodiment.

Turning now to FIG. 5, an SMA actuator 150 included in a material-actuated door 102 according to a non-limiting embodiment. The SMA actuator 150 is embedded in the door 102 (e.g., encased by the door housing), and includes a flexible spine 152, an SMA heating element 154, and an actuator housing 156. The actuator housing 156 encapsulates the flexible spine 152 and the SMA heating element 154 in a flexible material such as, for example, a flexible polymer or other type of flexible material.

The flexible spine 152 includes a solid material that is biased in a relaxed state or position. The solid material includes, but is not limited to, spring steel and carbon fiber woven to induce the biased relaxed state. The SMA heating element 154 is coupled to the flexible spine 152 and may be implemented as one or more wires, strips, and or sheets. The SMA heating element 154 is formed from a superalloy heat activated material, which is forced into an activated state or position in response to an increase in temperature. The superalloy heat activated material includes, for example, nickel-titanium (sometimes referred to as "Nitinol"). The composition of the nickel-titanium, for example, can be changed (e.g., by performing a heat treatment and/or introducing additives to the nickel-titanium material) such that the SMA heating element can be "tuned" to transition from the relaxed state to the activated state) at various targeted transition temperatures.

The SMA heating element 154 is electrically connected to the power supply 122. When the power supply 122 is activated, electrical current is delivered through SMA heating element 154 causing its temperature to increase. When temperature of the SMA heating element 154 exceeds its expansion temperature, it is forced into the activated state along with the flexible spine 152 and the actuator housing 156 to transition the SMA actuator 150 from the biased relaxed state to the activated state. When the current is removed (e.g., the power supply is deactivated), the temperature of the SMA heating element 154 falls below the expansion temperature, allowing the material of the flexible spine 152, which is biased in the relaxed state, to return the SMA actuator 150 into the first physical actuator state, e.g., the relaxed state.

Figure 6:
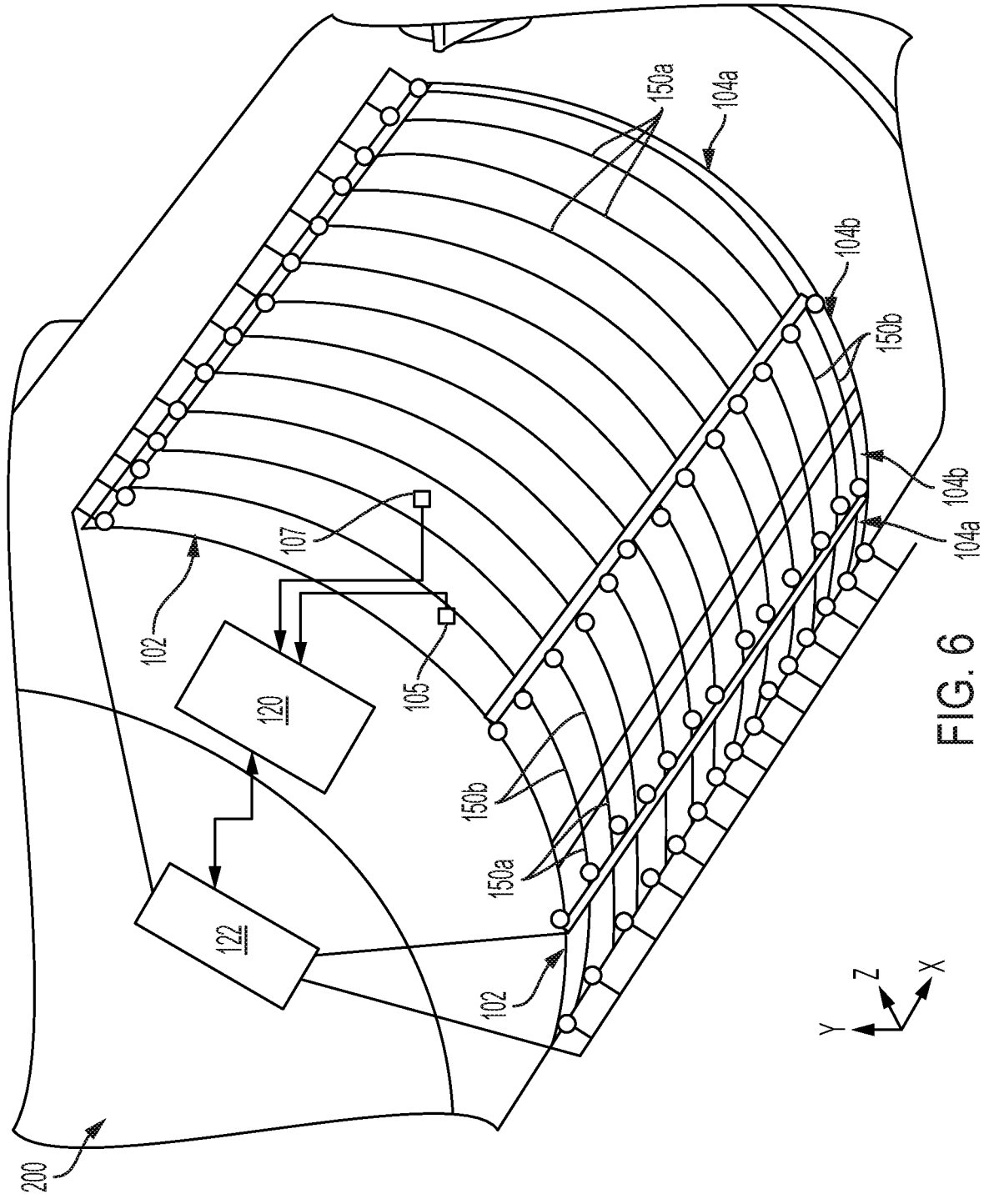
FIG. 6 depicts material-actuated door control system operating the doors in a closed position according to a non-limiting embodiment.
Figure 7:
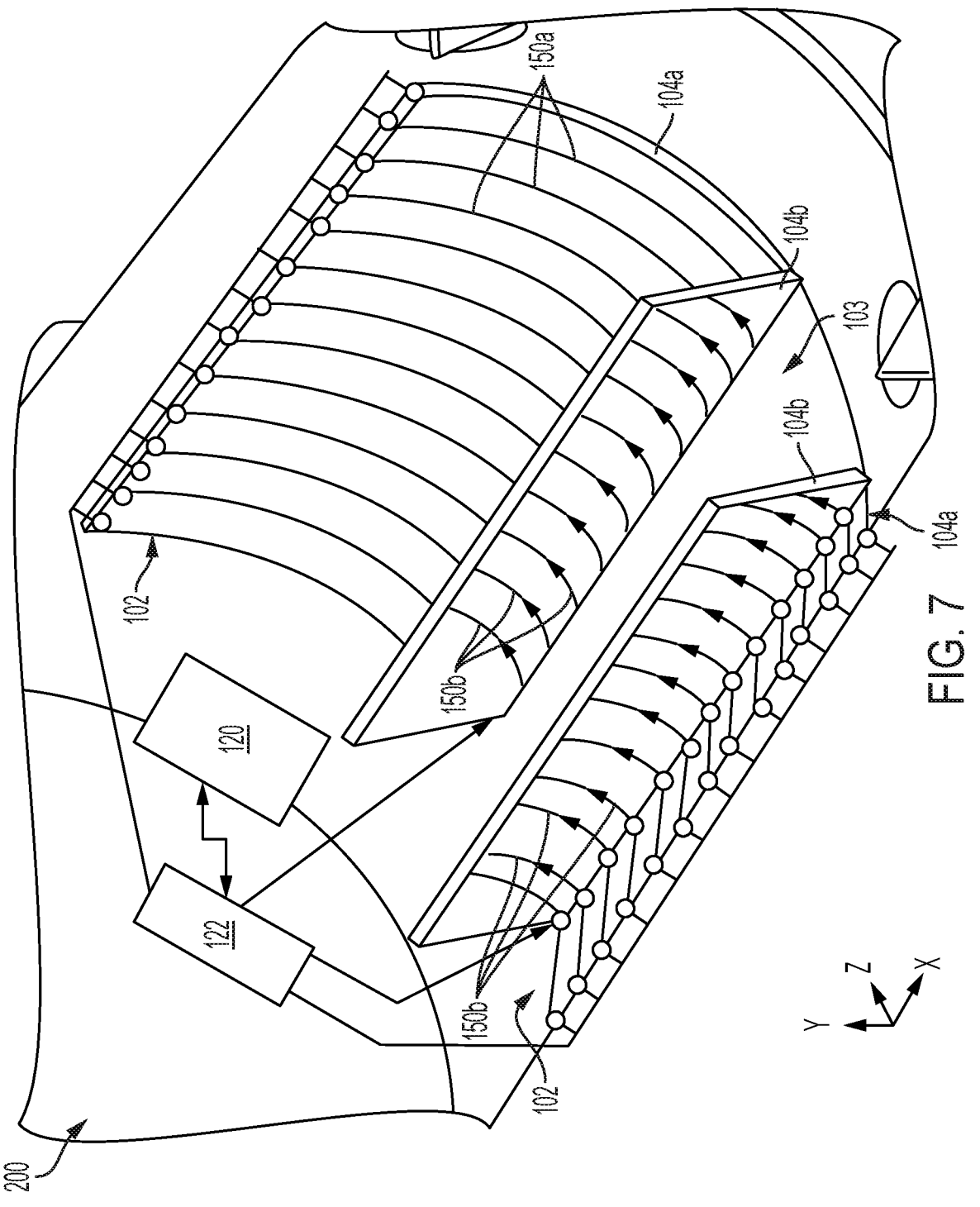
FIG. 7 depicts material-actuated door control system operating the doors in a partially open position according to a non-limiting embodiment.
Figure 8:
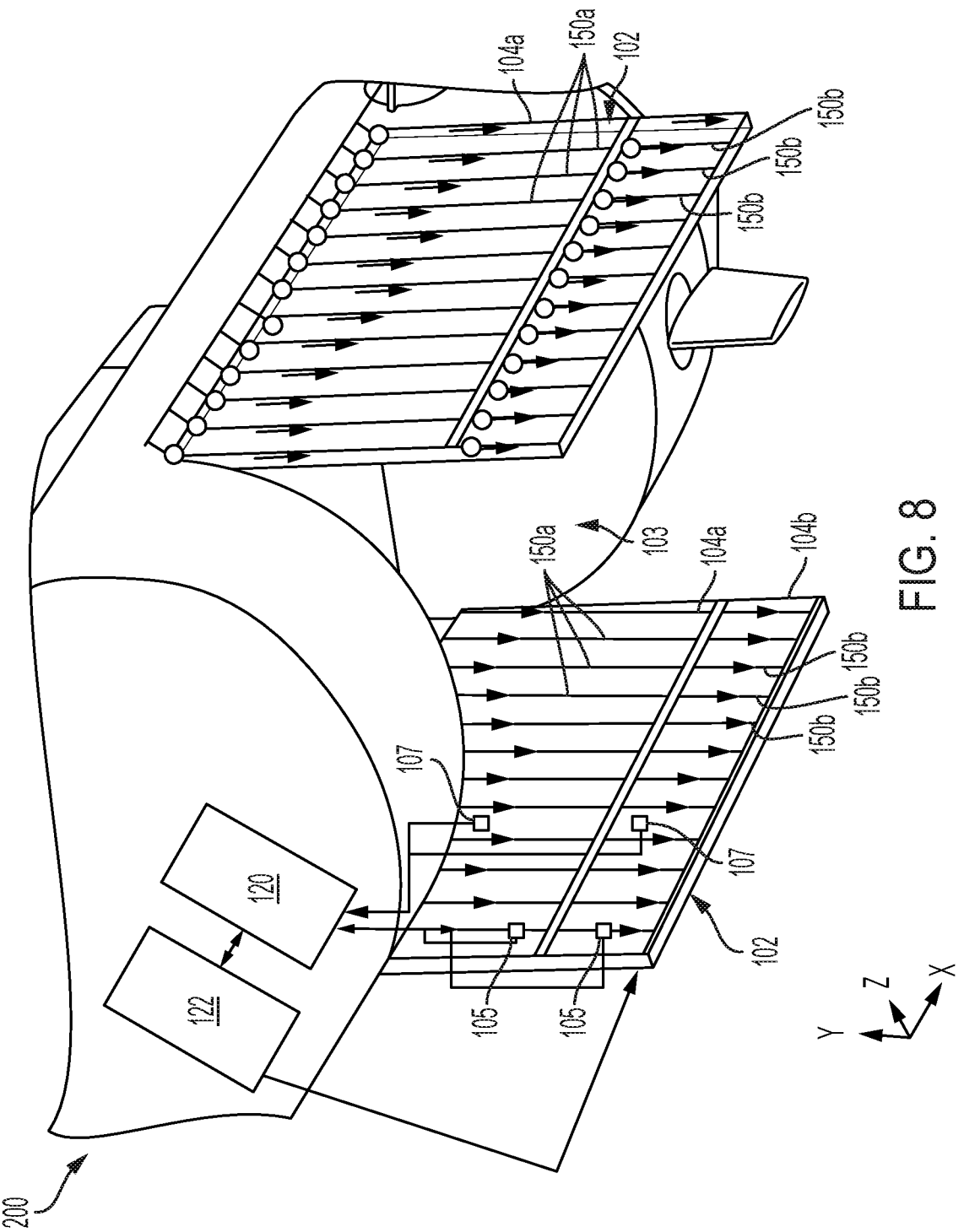
FIG. 8 depicts material-actuated door control system operating the doors in a fully open position according to a non-limiting embodiment.

With reference now to FIGS. 6, 7 and 8, a material-actuated door control system 200 is illustrated according to another non-limiting embodiment. The doors 102 each include a first array of SMA actuators 150a and a second array second array of SMA actuators 150b. The first array of SMA actuators 150a define a first panel 104a of a respective door 102 and the second array of SMA actuators 150b define a second panel of the respective door different from the first panel. Although two arrays of SMA actuators are illustrated, it should be appreciated that additional arrays of SMA actuators can be included to define additional panels of the doors 102. The first array of SMA actuators 150a and the second array of SMA actuators 150b are independently connected to the power supply 122. In FIG. 6, the power supply 122 is disconnected to prevent current delivery to the first array of SMA actuators 150a and the second array second array of SMA actuators 150b. Accordingly, the doors 102 are completely biased and are forced into a completely closed position as described herein.

Turning to FIG. 7, the controller 120 receives an input to partially open the doors 102. Accordingly, the controller 120 activates the power supply 122 and controls the power supply 122 to selectively output current to the second array of SMA actuators 104b, while disconnecting current from the first array of SMA actuators 104a. Accordingly, the second panels 104b are expanded and opened with respect to the first panels 104a, while the first panels 104a remain relaxed and closed. In this manner, the doors 102 can be partially opened 102. Partially opening the doors 102 may be desirable in various situations including, for example, to achieve reduced drag compared to the drag realized when the doors are fully opened, reduce radar signatures compared to when the doors 102 are fully opened, expose a partial area of the payload bay 103 rather the entire area of the payload bay 103, and allow at least partial access or opening of the exposes the payload bay 103 when there is a reduced distance between the vehicle and an object located below the payload bay 103.

Referring to FIG. 8, the controller receives an input to fully (i.e., completely) open the doors 102. Accordingly, the controller 120 activates the power supply 122 and controls the power supply 122 to selectively output current to all the SMA actuators included in the doors 102, e.g., the first array of SMA actuators 150a, along with the second SMA actuators 150b. Accordingly, all the panels of the doors 102, e.g., the first panels 104a and the second panels 104b are expanded such that the doors 102 are fully opened as described herein.

Figure 9:
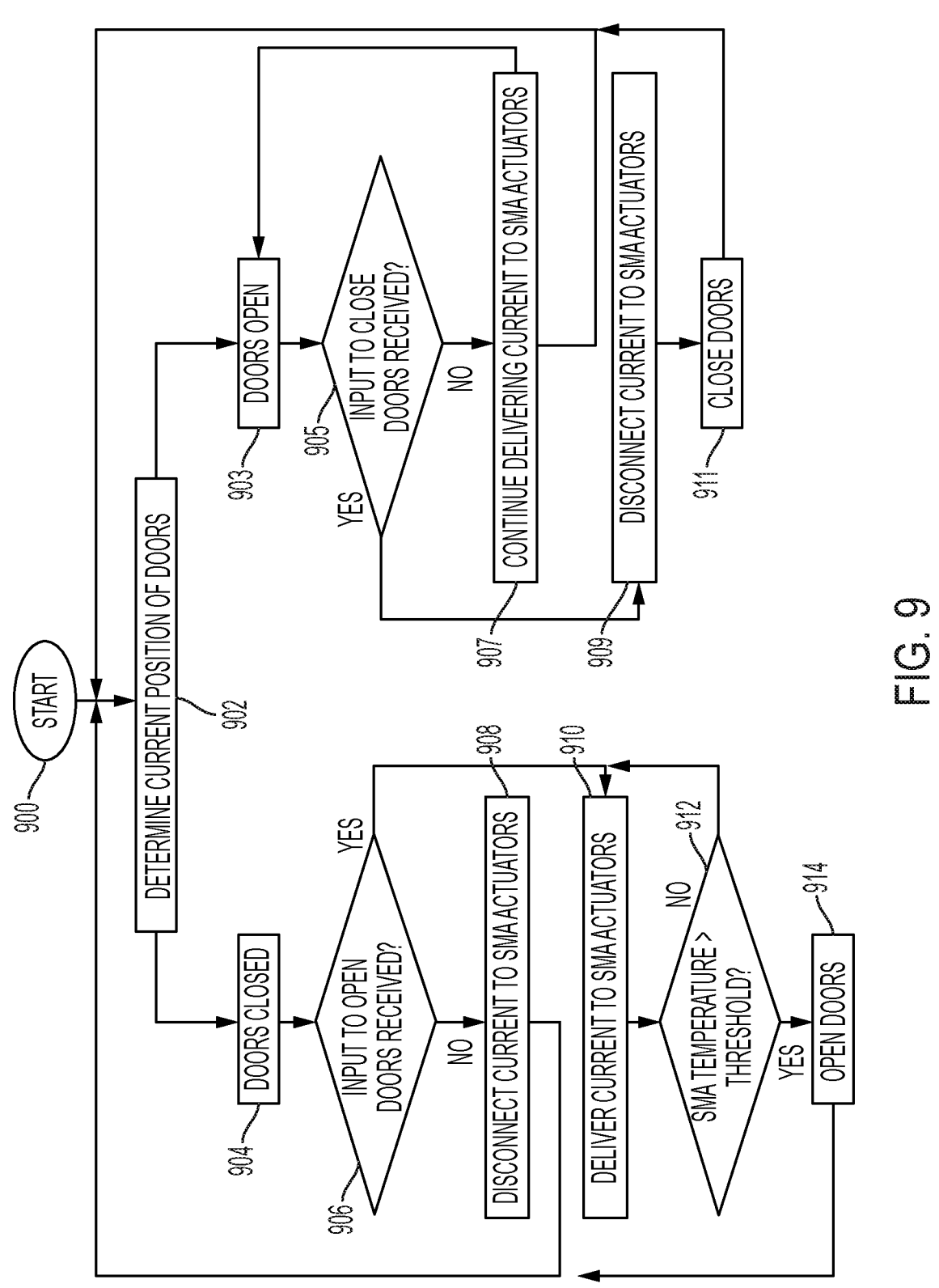
FIG. 9 is a flow diagram illustrating a method of operating material-actuated doors according to a non-limiting embodiment.

Referring now to FIG. 9, a method of operating material-actuated doors is illustrated according to a non-limiting embodiment. The method begins at operation 900, and at operation 902 a current (i.e., real-time) position of the doors are determined. At operation 904, for example, the doors are determined to be closed. Accordingly, at operation 906 a determination is made as to whether an input to open the doors has been received. When no input to open the doors has been received, electrical current is disconnected from the SMA actuators at operation 908, and the method returns to operation 902 to continue determining the current position of the doors.

When, however, an input to open the doors is received at operation 906, electrical current is delivered to the SMA actuators at operation 910. At operation 912, the temperatures of the SMA actuators are compared to the transition temperature threshold of the SMA actuators. When the temperatures of SMA actuators are less than the transition temperature threshold, the doors remain closed and current delivery to the SMA actuators continues at operation 910. When, however, the temperatures of SMA actuators exceed the transition temperature threshold, the SMA actuators are activated and the doors are opened at operation 914. Accordingly, the method returns to operation 902 to continue determining the current position of the doors.

Referring again to operation 902, the position of the doors can be determined to be open at operation 903. Accordingly, at operation 905 a determination is made as to whether an input to close the doors has been received. When no input to close the doors has been received, electrical current continues to be delivered to the SMA actuators at operation 907, and the method returns to operation 902 to continue determining the position of the doors.

When, however, an input to close the doors is received at operation 905, current is disconnected from the SMA actuators at 909. Accordingly, the doors are closed at operation 911, and the method returns to operation 902 to continue determining the current position of the doors.

As described herein, various non-limiting embodiments provide material-actuated doors capable of being opened and closed with a substantially reduced amount of traditional mechanical components can be utilized on various types of unmanned and/or manned vehicles. The material-actuated doors include Shape Memory Alloy (SMA) actuators included in compliant door panels including a flexible encapsulating material. The SMA actuators are biased in a closed-state (e.g. a relaxed state) and are configured to operate in response to temperature changes effected by flowing electrical current through the SMA actuator. The SMA actuators can be forced into the activated, open-state in response to a temperature of the SMA actuator exceeding a temperature threshold, thereby opening the material-actuated doors and providing access to the internal payload space. The temperature can then be reduced below the temperature threshold such that the biasing force transitions the material-actuated doors into the closed position, e.g., to completely close the doors.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A material-actuated door comprising:
a door housing including a flexible material; and
at least one Shape Memory Alloy (SMA) actuator embedded in the door housing, the at least one SMA actuator elastically biased in a first actuator physical state and is configured to transition into a second actuator physical state different from the first actuator physical state in response to receiving electrical current,
wherein the material-actuated door includes a first array of SMA actuators defining a first panel of the door and a second array of SMA actuators defining a second panel of the door, wherein the first array of SMA actuators is configured to induce the first door position of the first panel and wherein the second array of SMA actuators is configured to induce the second door position with respect to the first panel, and
wherein the material-actuated door is transitioned into a first door position in response to disconnecting the electrical current to the at least one SMA actuator, and is transitioned into a second door position different from the first door position in response to delivering the electrical current to the at least one SMA actuator.

2. The material-actuated door according to claim 1, wherein the at least one SMA actuator comprises:
a flexible spine including a solid material that is biased in the first physical actuator state;
an SMA heating element coupled to the flexible spine, the SMA heating element biased in the first physical actuator state and configured transition into the second physical actuator state in response to receiving the electrical current; and
an actuator housing encapsulating the flexible spine and the SMA heating element, the actuator housing including a flexible material and configured to contract or expand in response to inducing the first physical actuator state and the second physical actuator state of the SMA heating element and the flexible spine.

3. The material-actuated according to door claim 2, wherein flexible spine forces the SMA actuator into the first physical actuator state in response to disconnecting the electrical current from the SMA heating element.

4. The material-actuated door according to claim 3, wherein the SMA heating element is forced into the second physical actuator state in response to receiving the electrical current so as to force the material-actuated door into the second door position.

5. The material-actuated door according to claim 4, wherein the flexible spine comprises at least one of spring steel and carbon fiber.

6. The material-actuated door according to claim 5, wherein the SMA heating element comprises a superalloy heat activated material.

7. The material-actuated door according to claim 6, wherein the superalloy heat activated material includes nickel-titanium.

8. The material-actuated door control system according to claim 1, further comprising at least one sensor coupled to the material-actuated door and in signal communication with the controller, the at least one sensor configured to measure one or both of a temperature of the SMA actuator and a strain of the material-actuated door and to output a measurement signal indicative of a measured temperature of the SMA actuator and a measured strain of the material-actuated door.

9. The material-actuated door control system according to claim 1, wherein the controller determines the first door position and the second door position based on one or both of the measured temperature and the measured strain.

10. The material-actuated door control system according to claim 9, wherein the at least one SMA actuator comprises:
a flexible spine including a solid material that is biased in the first physical actuator state;
an SMA heating element coupled to the flexible spine, the SMA heating element biased in the first physical actuator state and is configured to transition into the second physical actuator state in response to receiving the electrical current; and
an actuator housing encapsulating the flexible spine and the SMA heating element, the actuator housing including a flexible material and configured to contract or expand in response to inducing the first physical actuator state and the second physical actuator state of the SMA heating element and the flexible spine.

11. The material-actuated door control system according to claim 10, wherein flexible spine forces the SMA actuator into the first physical actuator state in response to disconnecting the electrical current from the SMA heating element.

12. The material-actuated door control system according to claim 11, wherein the SMA heating element transitions into the second physical actuator state in response to receiving the electrical current so as to force the material-actuated door into the second door position.

13. The material-actuated door control system according to claim 12, wherein the flexible spine comprises at least one of spring steel and carbon fiber.

14. The material-actuated door control system according to claim 13, wherein the SMA heating element comprises a superalloy heat activated material.

15. The material-actuated door control system according to claim 14, wherein the superalloy heat activated material includes nickel-titanium.

16. A material-actuated door control system comprising:
a material-actuated door;
at least one Shape Memory Alloy (SMA) actuator embedded in the material-actuated door, the at least one SMA actuator elastically biased in a first physical actuator state and configured to transition into a second physical actuator state different from the first physical actuator state in response to receiving electrical current;

a power supply in signal communication with the at least one SMA actuator, and configured to output the electrical current; and a controller in signal communication with the power supply, the controller configured to receive a first input requesting the first door position and a second input requesting the second door position, and to activate or deactivate the power supply based on the first input and the second input, wherein the material-actuated door is induced into a first door position, in response to disconnecting the power supply so as to disconnect the electrical current from the SMA actuator and is induced into a second door position different form the first door position in response to activating the power supply and delivering the electrical current to the at least one SMA actuator, and wherein the material-actuated door includes a first array of SMA actuators defining a first panel of the door and a second array of SMA actuators defining a second panel of the door, wherein the first array of SMA actuators is configured to induce the first door position of the first panel and wherein the second array of SMA actuators is configured to induce the second door position with respect to the first panel.

17. The material-actuated door control system according to claim 16, wherein the controller receives a third input requesting a third door position to partially open the material-actuated door, and delivers the electrical current to the second array of SMA actuators while disconnecting current to the first array of SMA actuators such that the first panel remains in the first door position while the second panel is adjusted into the second door position.

18. The material-actuated door control system according to claim 17, wherein the controller receives the second input to place the material-actuated door in the second door position, and delivers the electrical current to first array of SMA actuators and the second array of SMA actuators such that the first and second panels are forced into the second door position and the material-actuated door is fully opened.

\* \* \* \* \*